US011606908B2

(12) United States Patent
Pasa et al.

(10) Patent No.: US 11,606,908 B2
(45) Date of Patent: Mar. 21, 2023

(54) INTERMITTENT KNOTTER GEAR

(71) Applicant: Deere & Company, Moline, IL (US)

(72) Inventors: Joshua J. Pasa, Centerville, IA (US);
Kyle R. Teach, Ottumwa, IA (US);
Eric R. Lang, Vinton, IA (US); Carl F. Demulder, Ankeny, IA (US); David V. Rotole, Bloomfield, IA (US)

(73) Assignee: Deere & Company, Moline, IL (US)

( * ) Notice: Subject to any disclaimer, the term of this patent is extended or adjusted under 35 U.S.C. 154(b) by 135 days.

(21) Appl. No.: 16/918,120

(22) Filed: Jul. 1, 2020

(65) Prior Publication Data

US 2022/0000033 A1  Jan. 6, 2022

(51) Int. Cl.
A01F 15/08       (2006.01)
A01F 15/14       (2006.01)

(52) U.S. Cl.
CPC ........ A01F 15/0858 (2013.01); A01F 15/145 (2013.01)

(58) Field of Classification Search
CPC .......................... A01F 15/0858; A01F 15/145
See application file for complete search history.

(56) References Cited

U.S. PATENT DOCUMENTS

| 5,829,346 | A | * | 11/1998 | Ast ....................... A01F 15/145 100/21 |
| 6,164,197 | A | * | 12/2000 | Prellwitz ............... A01F 15/145 100/22 |
| 6,957,835 | B2 | | 10/2005 | Rotole |
| 7,752,959 | B1 | * | 7/2010 | Roth ..................... A01F 15/145 100/33 R |
| 8,671,834 | B1 | | 3/2014 | Rotole et al. |
| 9,807,941 | B2 | | 11/2017 | Demulder |
| 2012/0211979 | A1 | * | 8/2012 | Schumacher ......... A01F 15/145 289/2 |

FOREIGN PATENT DOCUMENTS

| DE | 19819595 A1 | 11/1999 |
| DE | 202009019023 U1 | 8/2015 |
| EP | 2260693 A1 | 12/2010 |

OTHER PUBLICATIONS

Extended European Search Report and Written Opinion issued in European Patent Application No. 21179375.7, dated Nov. 30, 2021, in 07 pages.

* cited by examiner

*Primary Examiner* — Matthew Katcoff
*Assistant Examiner* — Mohammed S. Alawadi
(74) *Attorney, Agent, or Firm* — Lucian Wayne Beavers; Patterson Intellectual Property Law, PC

(57) ABSTRACT

A knotter drive apparatus for a baler includes a knotter gear drive shaft having a drive shaft axis and a shaft outside diameter. A plurality of knotter assemblies are mounted on the knotter gear drive shaft. Each assembly includes a first knotter gear sector including a first sector hub portion and a first sector radial portion. The first sector hub portion includes a central passage at least partly defined in the first sector hub portion for receiving the knotter gear drive shaft. The first sector radial portion extends radially outward from the first sector hub portion relative to the drive shaft axis, and has defined thereon a plurality of intermittent gear tooth segments. The first sector hub portion has a circumferential gap defined therein greater than the shaft outside diameter such that the first knotter gear sector is removable radially, relative to the drive shaft axis, from the knotter gear drive shaft.

6 Claims, 14 Drawing Sheets

INTERMITTENT KNOTTER GEAR

FIELD OF THE DISCLOSURE

The present disclosure relates a knotter gear for use in a baler, and particularly to an intermittent knotter gear for use in a large square baler.

BACKGROUND

Balers for producing parallelepiped bales in their baling chambers, so-called square balers, are equipped with knotter tables including a plurality of knotter assemblies mounted on a common knotter gear drive shaft. Each knotter assembly ties a twine loop about finished bales formed in bale chambers of the balers. Each knotter assembly includes a knotter gear which slides axially onto the knotter gear drive shaft.

Should the knotter gear need to be replaced the entire knotter assembly must be removed axially from the knotter gear drive shaft along with additional mechanisms such as the tucker finger cam, brake, shaft support, bearing and other components. The time and effort required to remove the knotter gear and other mechanisms is significant.

There is a need for improvements in the construction of such knotter assemblies that will reduce the amount of time and effort required to replace a broken or worn knotter gear.

SUMMARY OF THE DISCLOSURE

In one embodiment a knotter drive apparatus for a baler includes a knotter gear drive shaft having a drive shaft axis and a shaft outside diameter. A plurality of knotter assemblies are mounted on the knotter gear drive shaft. Each assembly includes a first knotter gear sector including a first sector hub portion and a first sector radial portion. The first sector hub portion includes a central passage at least partly defined in the first sector hub portion for receiving the knotter gear drive shaft. The first sector radial portion extends radially outward from the first sector hub portion relative to the drive shaft axis, and has defined thereon a plurality of intermittent gear tooth segments. The first sector hub portion has a circumferential gap defined therein greater than the shaft outside diameter such that the first knotter gear sector is removable radially, relative to the drive shaft axis, from the knotter gear drive shaft.

In some embodiments the knotter assembly includes a two piece knotter gear including the first knotter gear sector and a second knotter gear sector.

In other embodiments the knotter gear is a single piece knotter gear and the first knotter gear sector is the one and only one knotter gear sector.

In another embodiment a knotter drive apparatus for a baler comprises first and second knotter gear sectors. The first knotter gear sector includes a first sector hub portion and a first sector radial portion. The second knotter gear sector includes a second sector hub portion and a second sector radial portion. The first and second sector hub portions are generally semi-cylindrical in shape such that when joined together the first and second sector hub portions define a central passage therethrough, the central passage having a central axis. The first sector radial portion extends radially outward from the first sector hub portion and has a plurality of intermittent gear tooth segments defined thereon. The second sector radial portion extends radially outward from the second sector hub portion.

Numerous objects, features and advantages of the present invention will be readily apparent to those skilled in the art upon a reading of the following disclosure when taken in conjunction with the accompanying drawings.

DETAILED DESCRIPTION

Preliminarily, it is to be noted that the terms "right" and "left" are in accordance with an observer standing behind and facing in a forward direction of travel of a baler equipped with a tying table constructed in accordance with the present invention.

Figure 1A:
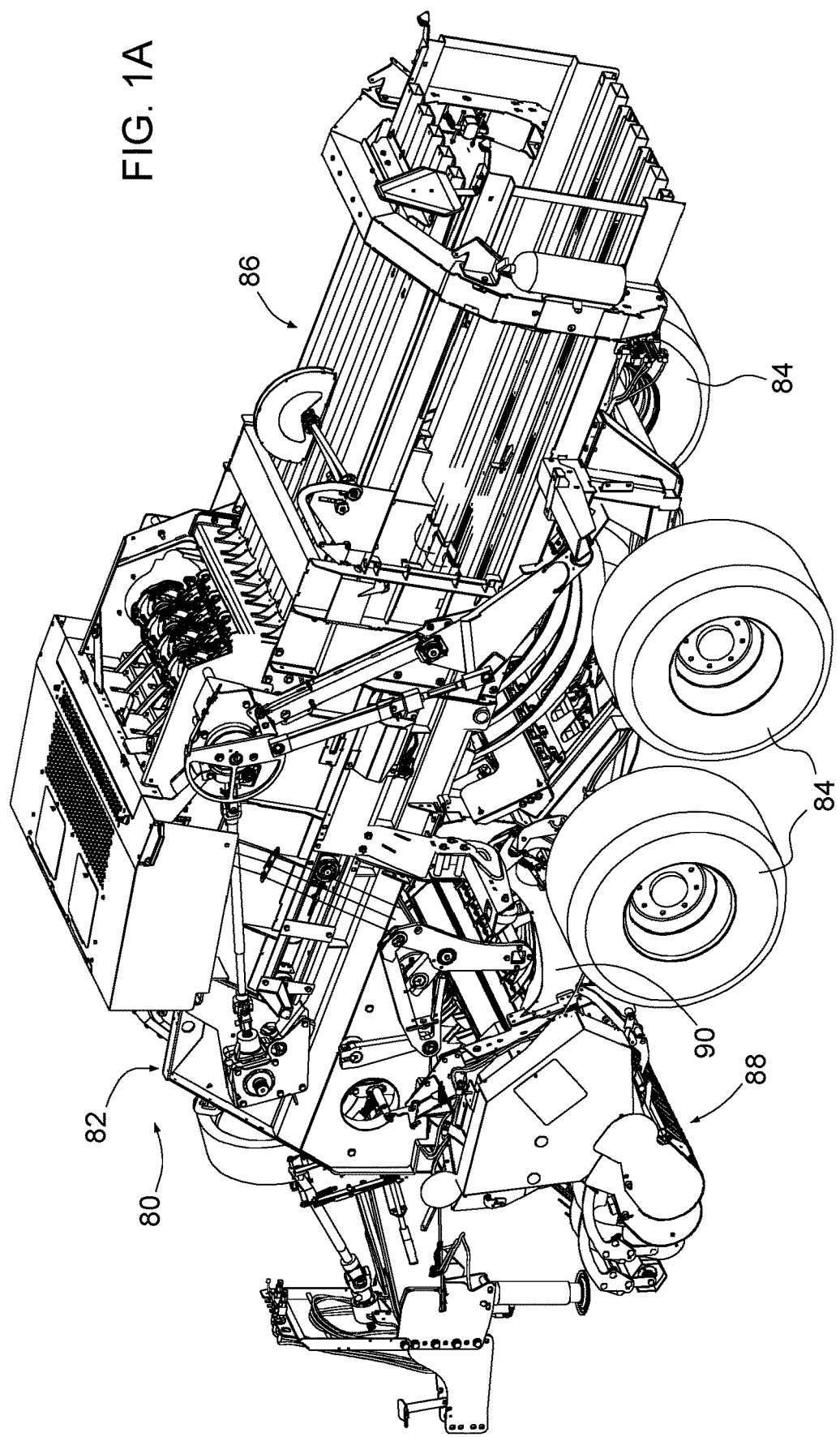
FIG. 1A is a left rear perspective view of a large square baler.

Referring now to FIG. 1A, there is shown a large square baler 80 including a main frame 82 supported on ground wheels 84 for being towed across a field containing windrows of crop to be baled. The main frame 82 includes a baling chamber 86 extending longitudinally from a forward central location of the baler 80. A crop pick-up and conditioning arrangement 88 is provided at a front underside location of the main frame 82 and feeds gathered crop through a crop delivery chute 90 that curves upwardly and rearwardly from the pick-up and conditioning arrangement 88 and delivers crop through an opening (not shown) provided in the baling chamber bottom wall from where it is periodically engaged by a reciprocating plunger (not shown)

and pushed to the rear to form a compressed bale of crop. A knotter table 10 provides a system for tying six loops of twine about a large parallelepiped bale formed in the baling chamber 86. It is noted that for different sizes of balers a knotter table for tying a different number of loops of twine may be used without departing from the principles of the present invention.

Figure 1B:
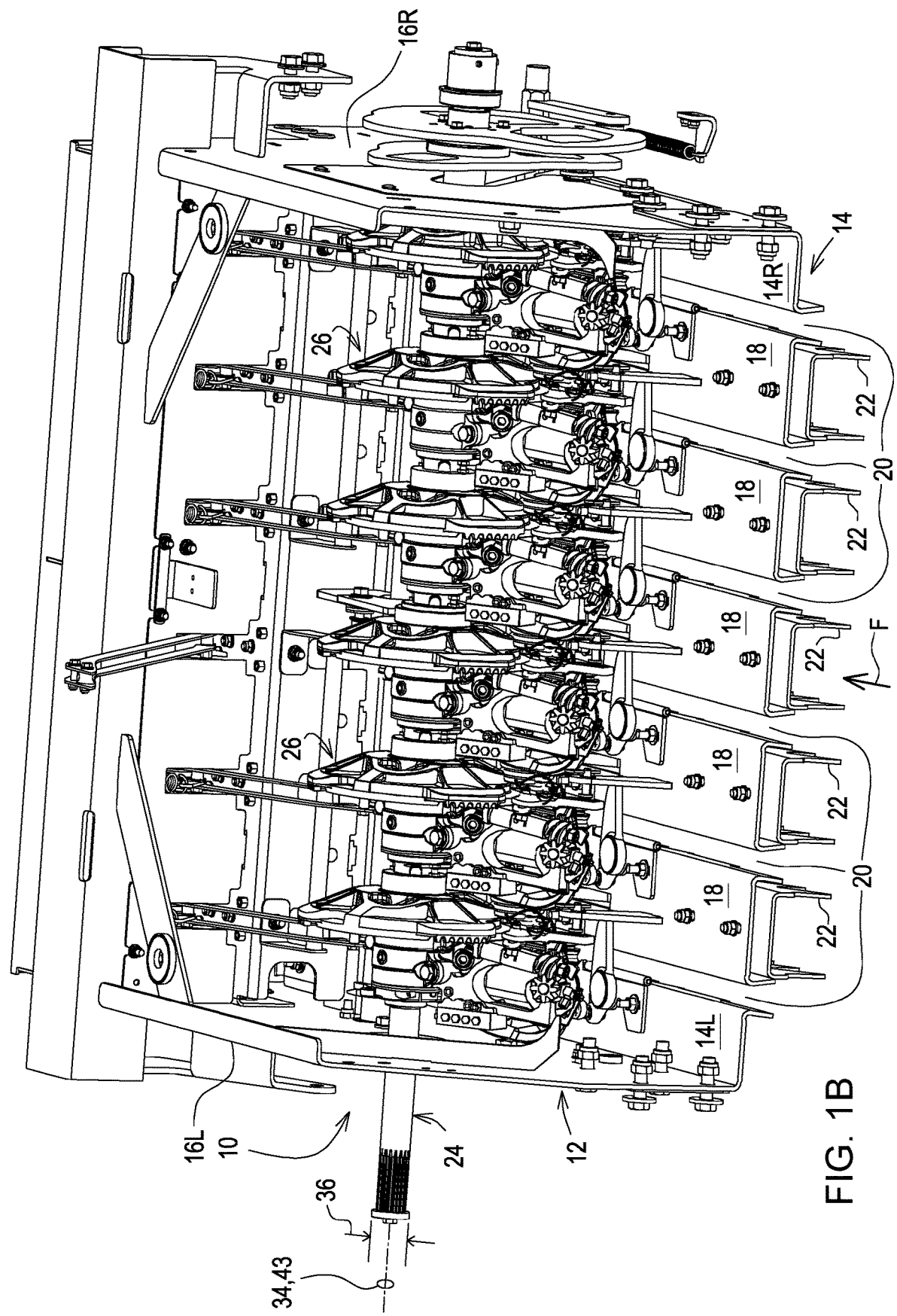
FIG. 1B is a right rear perspective view of a portion of the knotter table of the large square baler of FIG. 1A embodying knotter assemblies having knotter gears constructed in accordance with the present invention.

Referring now to FIG. 1B, an enlarged view is shown of the knotter table 10 for use with the large square baler 80 having a forward direction of travel as indicated by an arrow F. The knotter table 10 includes a support frame 12 comprising a bottom wall or floor 14 including L-shaped right- and left-hand bottom wall segments 14R and 14L respectively being formed by inwardly bent, L-shaped portions of right- and left-hand side walls 16R and 16L. The bottom wall further includes a plurality central bottom wall segments 18 comprising downwardly opening, longitudinally extending channel members that are spaced transversely from each other and from the short legs of the wall segments 14R and 14L to define a plurality of longitudinal needle slots 20 for respectively permitting a like number of twine-carrying needles (not shown) to swing upwardly through them during a tying cycle for securing a plurality of sets of twine strands together to form loops of twine about a bale formed in a baling chamber having a rear top region including a plurality of channel members 22 located within and supporting the knotter table bottom wall segments 18.

A central component of the knotter table 10 is a knotter gear drive shaft 24 extending transversely to the direction of travel of the baler. Opposite end regions of the drive shaft 24 are respectively supported in bearing assemblies (not shown) including right and left bearing housings respectively mounted to the right and left vertical side walls 16R and 16L. Six identical knotter assemblies 26 are mounted at equally spaced locations across a middle region of the drive shaft 24. The knotter gear drive shaft 24 has a drive shaft axis 34 and a shaft outside diameter 36.

Figure 2:
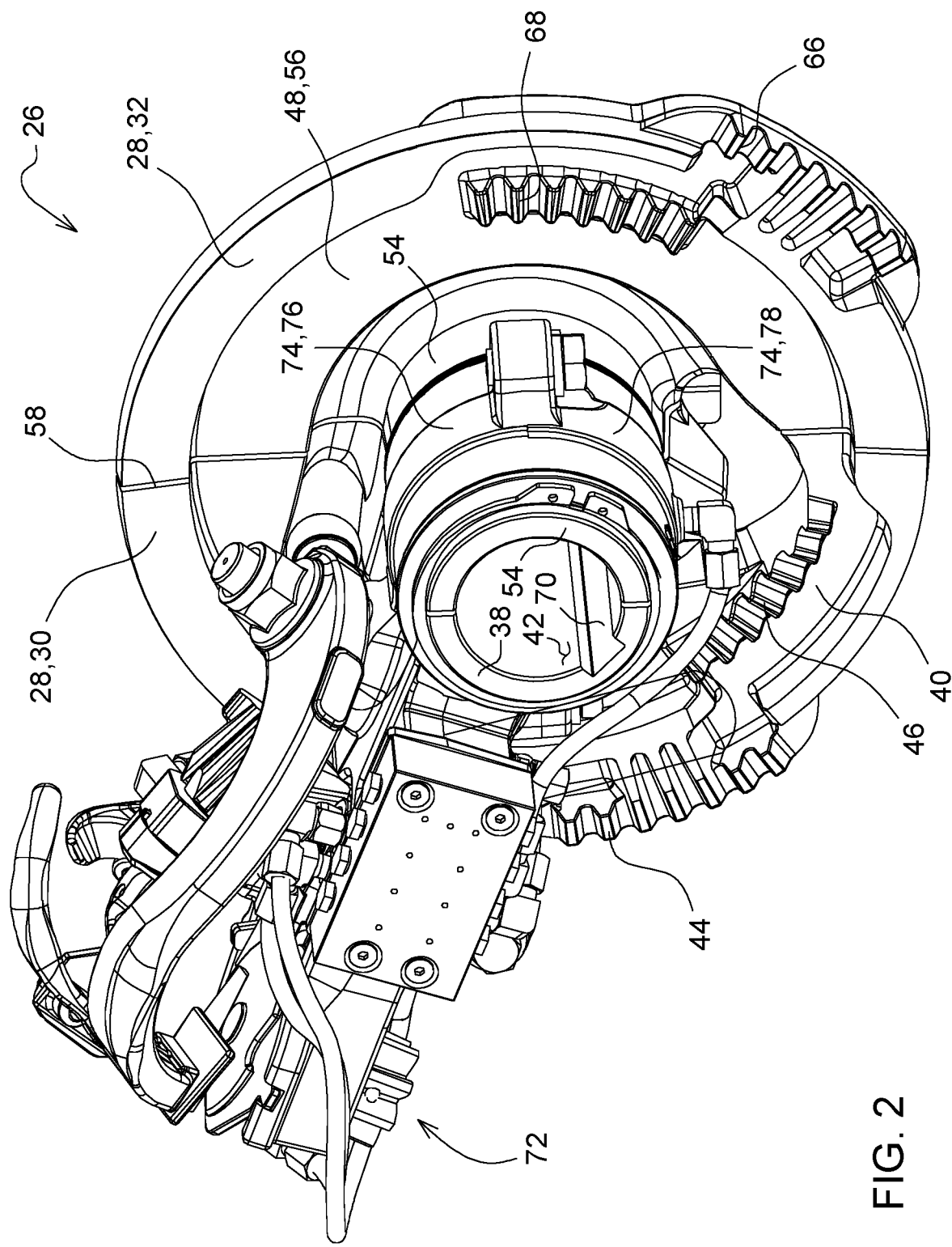
FIG. 2 is a drive side perspective view of a knotter assembly including a first embodiment of a two piece knotter gear.
Figure 3:
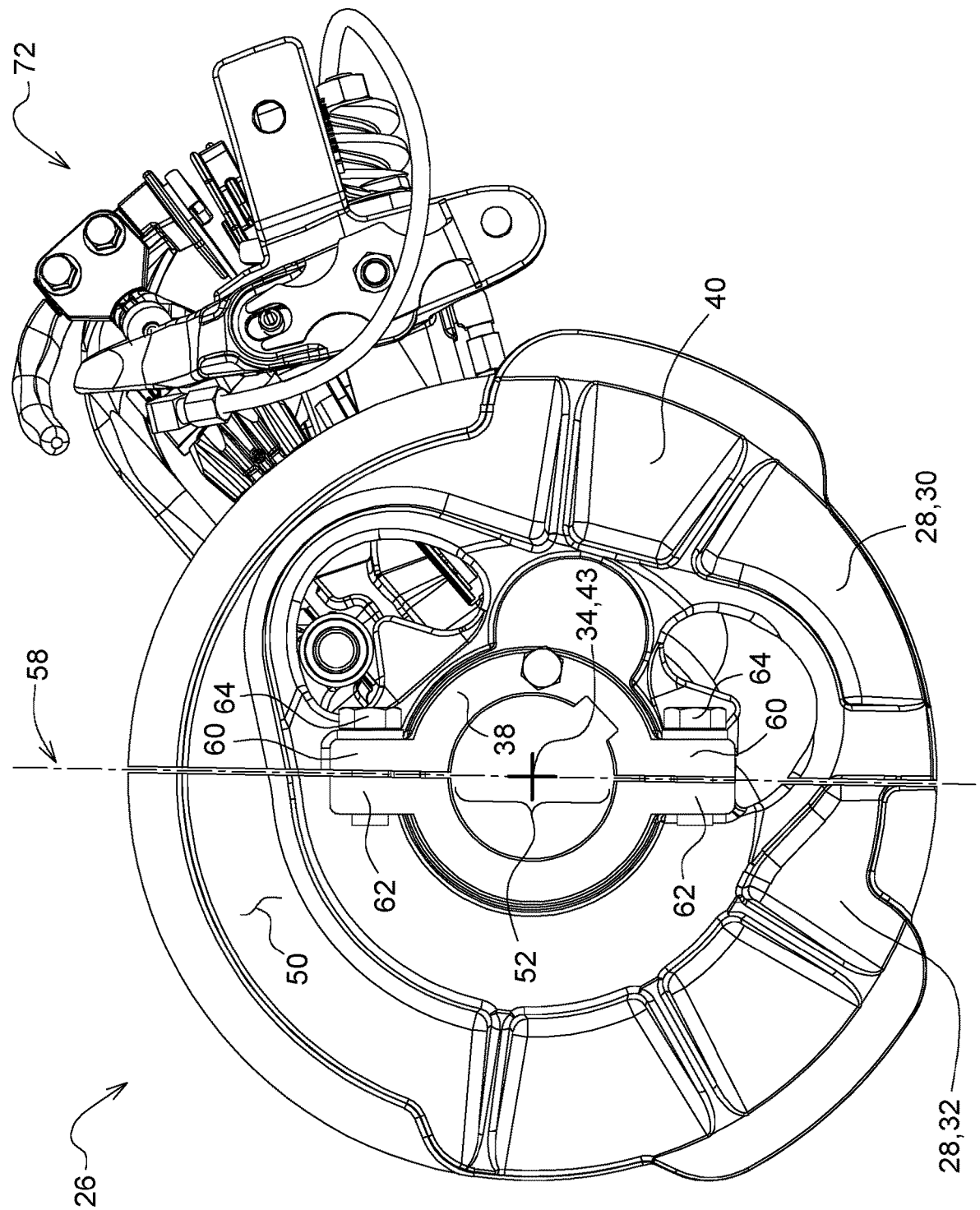
FIG. 3 is a back side elevation view of the knotter assembly of FIG. 2.
Figure 4:
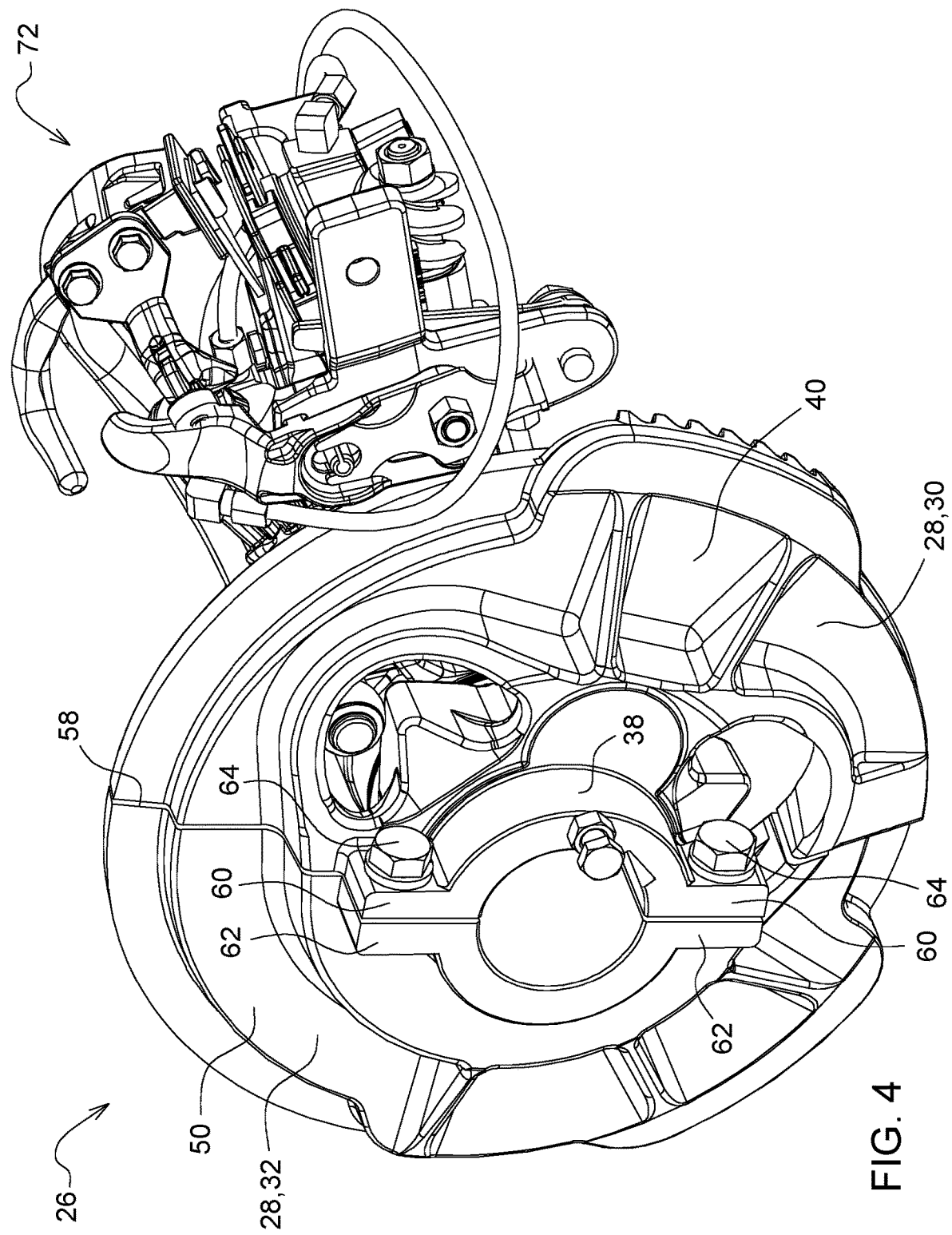
FIG. 4 is a back side perspective view of the knotter assembly of FIG. 2.

Embodiment of FIGS. 2-4

Referring now to FIG. 2, each knotter assembly 26 includes a generally circular knotter gear 28. The knotter gear 28 of FIG. 2 is a two piece knotter gear including first and second knotter gear sectors 30 and 32.

The first knotter gear sector 30 includes a first sector hub portion 38 and a first sector radial portion 40. A central passage 42 of the knotter assembly 26 is at least partially defined in the first sector hub portion 38 for receiving the knotter gear drive shaft 24. The first sector radial portion 40 extends radially outward from the first sector hub portion 38 relative to the drive shaft axis 34. A plurality of intermittent gear tooth segments 44 and 46 are defined on the first sector radial portion 40. A side 48 of the knotter gear 28 having the gear tooth segments thereon is referred to herein as the drive side 48 of the knotter gear 28, with the opposite side 50 being referred to herein as a back side of the knotter gear 28. The drive side 48 may be described as facing in a first axial direction parallel to shaft axis 34, and the back side 50 may be described as facing in a second axial direction opposite from the first axial direction.

The first sector hub portion 38 can be described as having a circumferential gap 52 (see FIG. 3) defined therein greater than the shaft outside diameter 36 such that the first knotter gear sector 30 is removable radially, relative to the drive shaft axis 34, from the knotter gear drive shaft 24. In the embodiment of FIGS. 2-4 the circumferential gap 52 spans an arc of 180 degrees about the shaft axis 34.

The second knotter gear sector 32 includes a second sector hub portion 54 and a second sector radial portion 56. The second sector hub portion 54 defines a further part of the central passage 42. The second sector radial portion 56 extends radially outward from the second sector hub portion 54 relative to the drive shaft axis 34. The second sector hub portion 54 can be described as closing or spanning in the circumferential gap 52 of the first sector hub portion 38 when the knotter assembly 26 is installed on the knotter gear drive shaft 24.

In the embodiment of FIGS. 2-4 the first and second knotter gear sectors 30 and 32 each comprise substantially a 180 degree portion of the knotter assembly 26 relative to the drive shaft axis 34 such that the first and second knotter gear sectors 30 and 32 are divided from each other at a diametrical divide 58 extending substantially diametrically relative to the drive shaft axis 34. The first and second sector hub portions 38 and 54 include hub flanges 60 and 62, respectively, extending parallel to each other and parallel to the diametrical divide 58. The hub flanges 60 and 62 extend from the back side 50 of the first and second knotter gear sectors 30 and 32. At least one connector 64 extends between the hub flanges 60 and 62 and connects the first and second knotter gear sectors 30 and 32 when the knotter assembly 26 is installed on the knotter gear drive shaft 24.

The first and second sector hub portions 38 and 54 can be described as being generally semi-cylindrical in shape such that when joined together they define the central passage 42 therethrough. The central passage 42 has a central axis 43 (see FIG. 3) which is coincident with the drive shaft axis 34.

In the embodiment of FIGS. 2-4 the second sector radial portion 56 has a second plurality of intermittent gear tooth segments 66 and 68 defined on its drive side.

In the embodiment of FIGS. 2-4 the central passage 42 is configured to closely receive the knotter gear drive shaft 24, and at least one of the first and second sector hub portions 38 and 54 includes an internal groove 70 which is keyed to the knotter gear drive shaft 24 such that the knotter gear 28 is rotationally fixed relative to the knotter gear drive shaft 24.

Each knotter assembly 26 further includes a knotter frame 72 having an upper end defined by a two-piece cylindrical head frame assembly 74 received on the left end of the first and second sector hub portions 38 and 54 so as to permit the knotter gear 28 to rotate relative to the knotter frame 72. The head frame assembly 74 includes a main head frame portion 76 and a head frame cap 78 configured such that when the head frame cap 78 is bolted to the main head frame portion 76 the head frame assembly 74 circumscribes the knotter gear drive shaft 24 and the first and second sector hub portions 38 and 54. The head frame assembly 74 is configured such that the head frame cap 78 must be removed from the main head frame portion 76 to allow the first and second knotter gear sectors 30 and 32 to be removed radially, relative to the drive shaft axis 34 from the knotter gear drive shaft 24.

Embodiment of FIGS. 5-9

Figure 5:
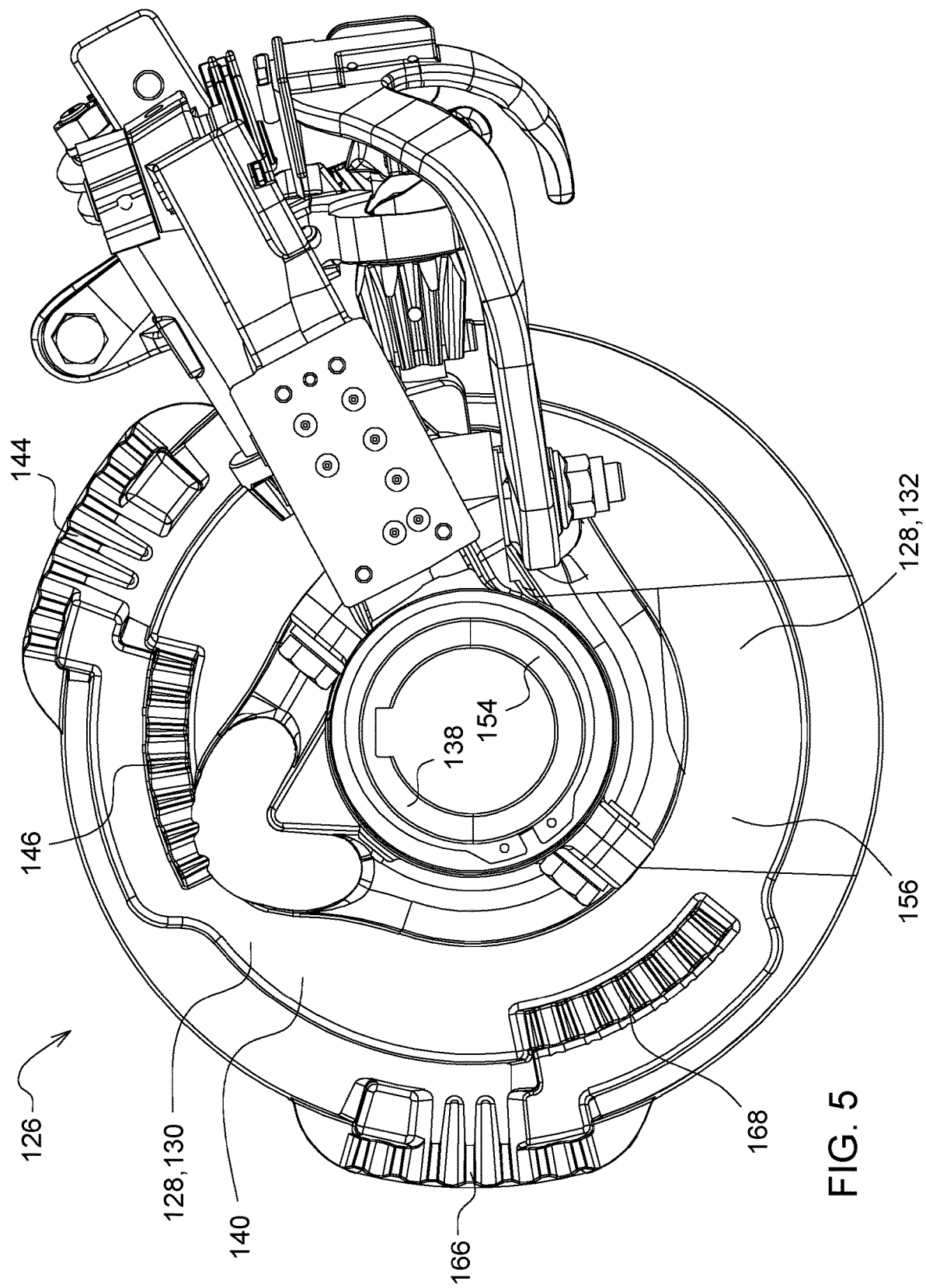
FIG. 5 is a drive side perspective view of a knotter assembly including a second embodiment of a two piece knotter gear.
Figure 6:
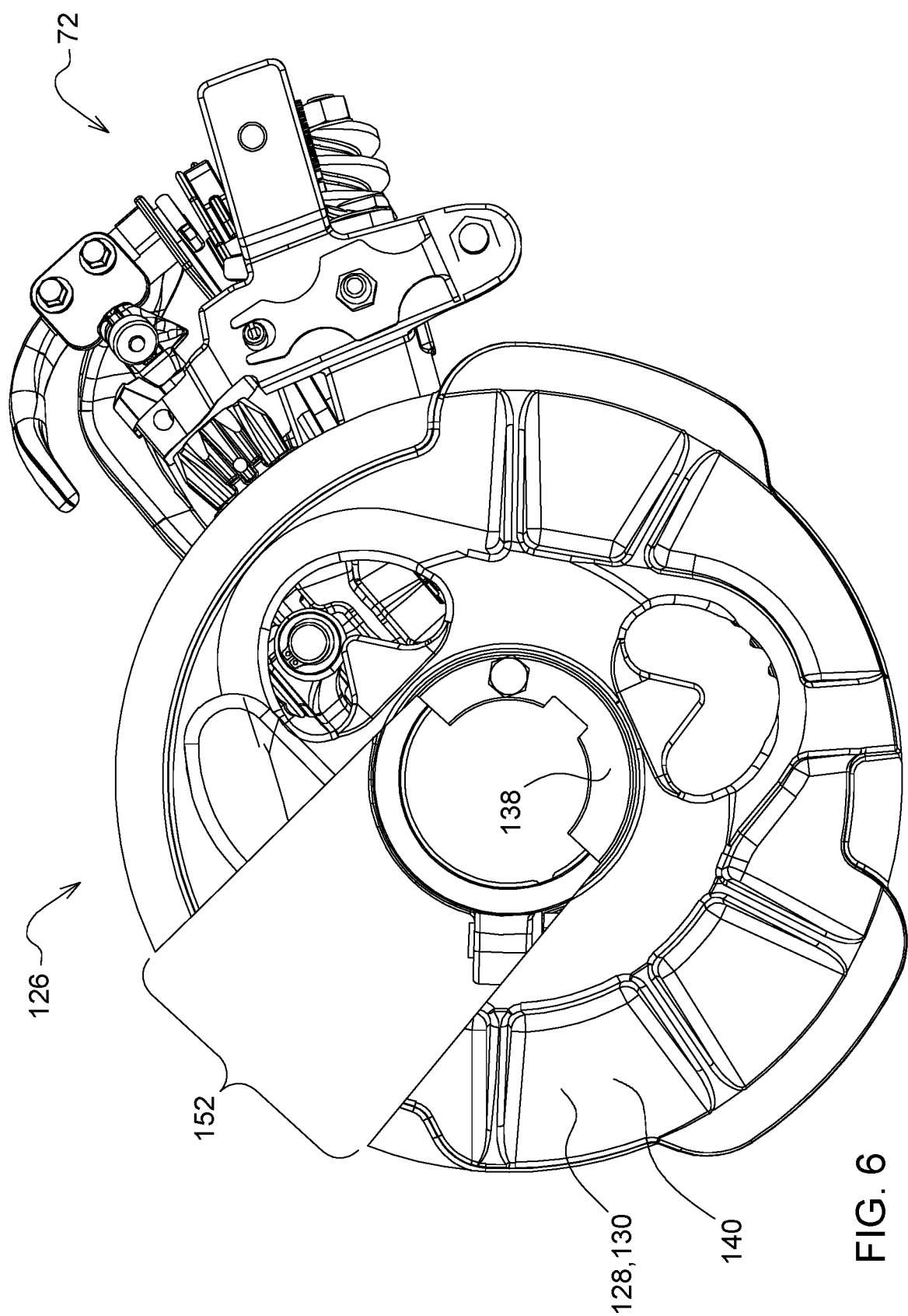
FIG. 6 is a back side elevation view of the knotter assembly of FIG. 5 with the second knotter gear sector removed.
Figure 7:
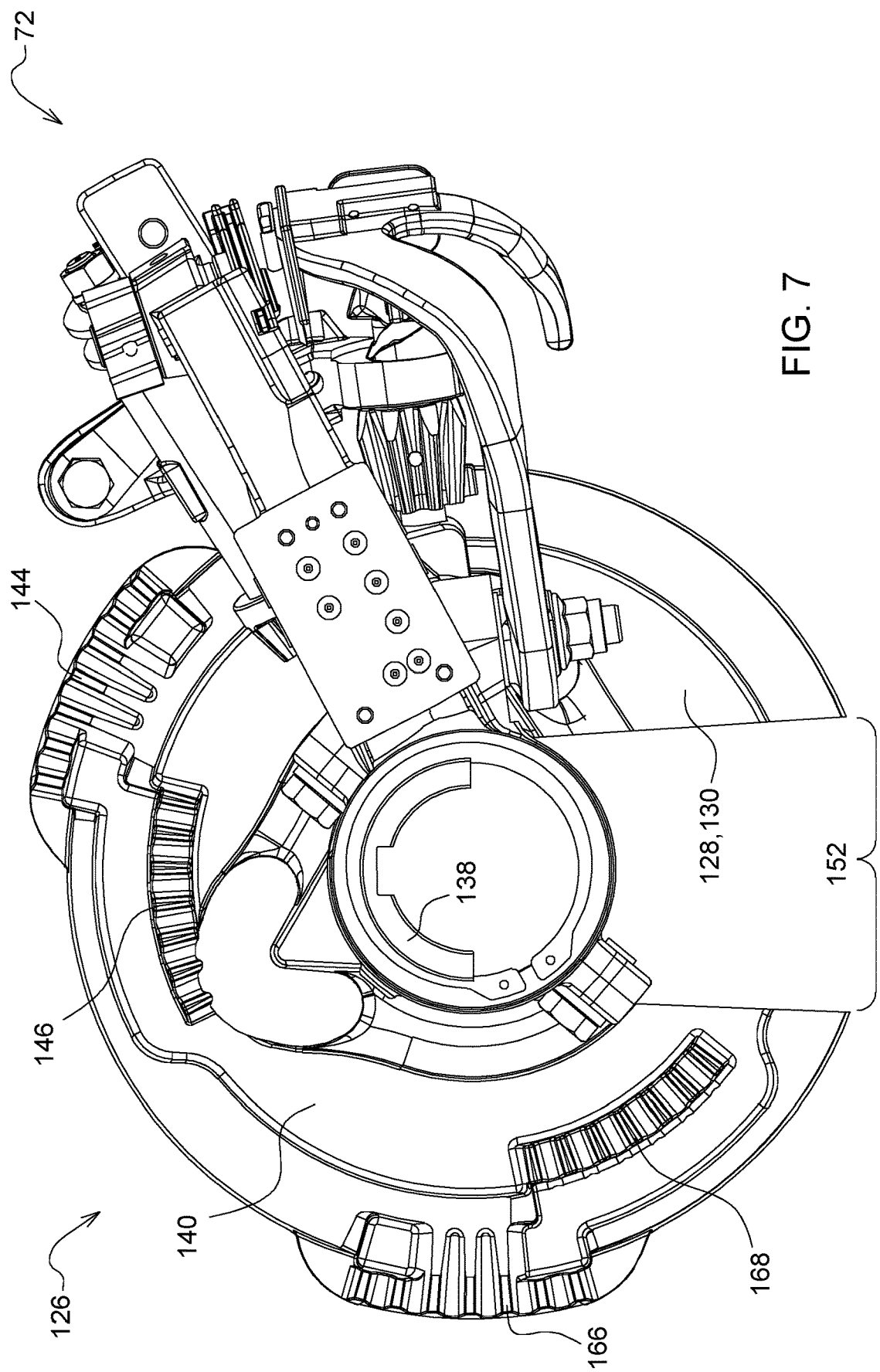
FIG. 7 is a front side elevation view of the knotter assembly of FIG. 5 with the second knotter gear sector removed.
Figure 8:
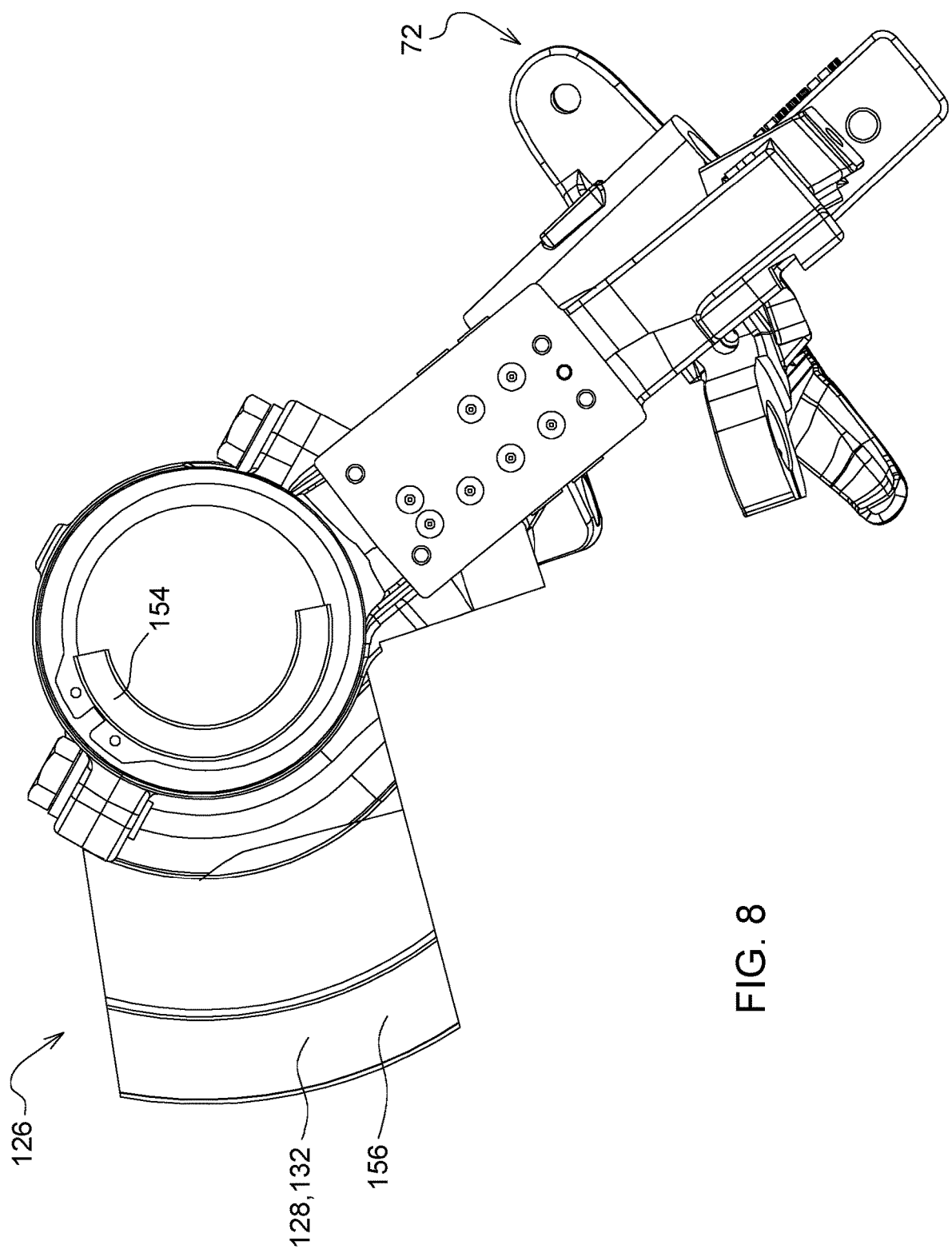
FIG. 8 is a drive side perspective view of the second knotter gear sector removed from the knotter assembly of FIG. 5.

Referring now to FIG. 5, an alternative embodiment of a knotter assembly is designated as 126 and includes a generally circular knotter gear 128. The knotter gear 128 of FIG. 5 is also a two piece knotter gear including first and second knotter gear sectors 130 and 132. In this case the first knotter gear sector 130 includes a first sector radial portion 140 which circumscribes greater than 180 degrees relative to the drive shaft axis. The second sector radial portion 156 circumscribes less than 180 degrees relative to the drive shaft axis 34. Each of the first and second sector hub portions 138 and 154, however, still circumscribe substantially 180 degrees relative to the drive shaft axis. 34

The first knotter gear sector 130 has a gap 152 defined therein which is larger than the shaft outside diameter 36 and thus permits the first knotter gear sector 130 to be removed radially relative to the knotter gear drive shaft 24 when the second knotter gear sector 132 is disconnected from the first knotter gear sector 130.

Figure 9:
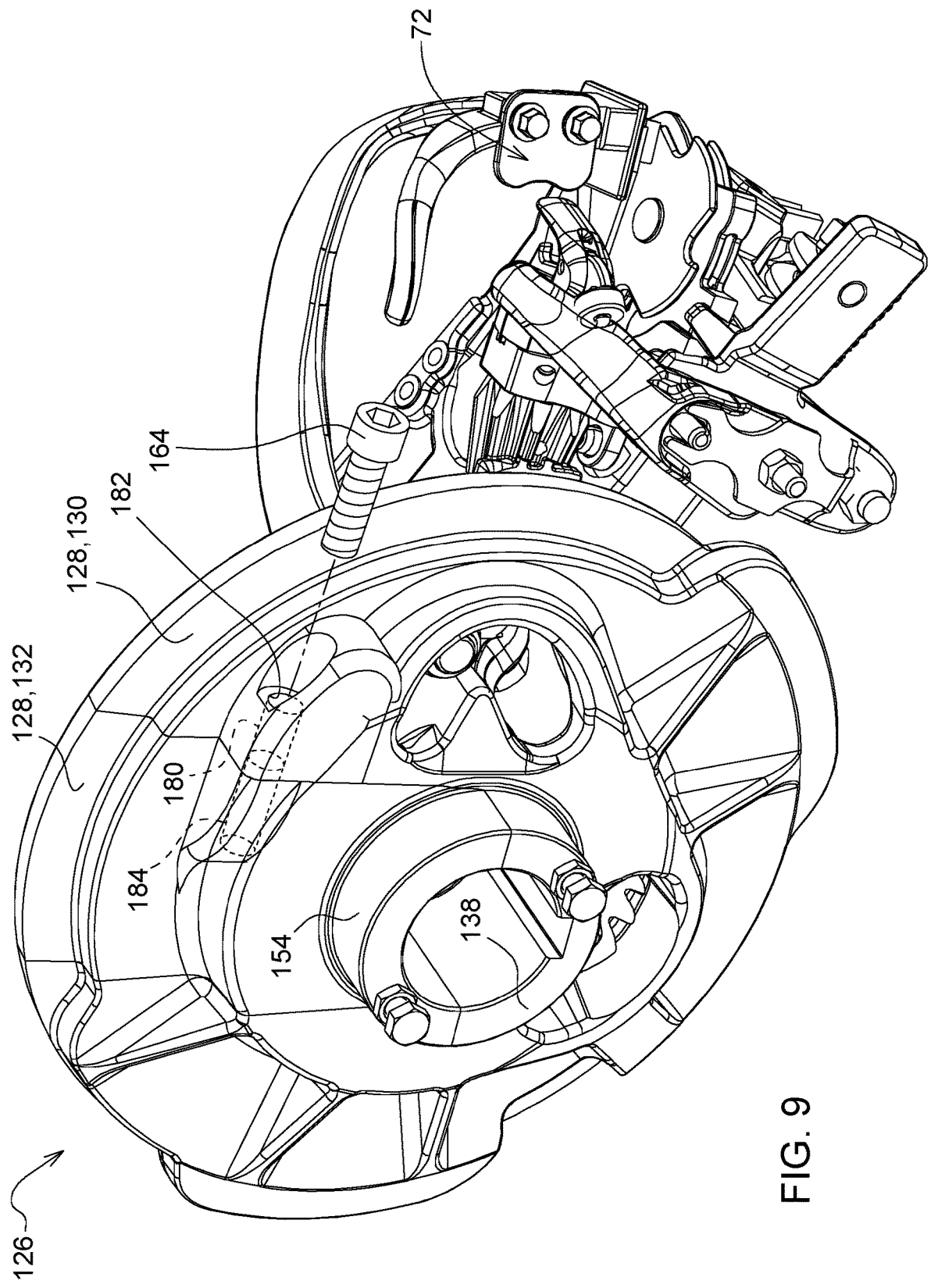
FIG. 9 is a back side perspective view of the two piece knotter gear of FIG. 5 having a cast in boss for a fastener to hold the first and second knotter gear sectors together.

As best shown in FIG. 9, the first knotter gear sector 130 may include a cast in boss 180 having a connector passage 182 defined therethrough transverse to the drive shaft axis 34. The second sector radial portion 156 of the second knotter gear sector 132 may have a threaded connector receptacle 184 defined therein and aligned with the connector passage 182. At least one connector 164 may extend through the connector passage 182 into the threaded connector receptacle 184 to connect the first and second sector radial portions 140 and 156. Alternatively, the boss 180 could be formed in the second knotter gear sector 132 and the threaded connector receptacle 184 could be formed in the first knotter gear sector 130.

Also, in the knotter gear 128 all of the intermittent gear tooth segments 144, 146, 166 and 168 are located on the first sector radial portion 140. In this embodiment there are no intermittent gear tooth segments on the second sector radial portion 156.

Figure 10:
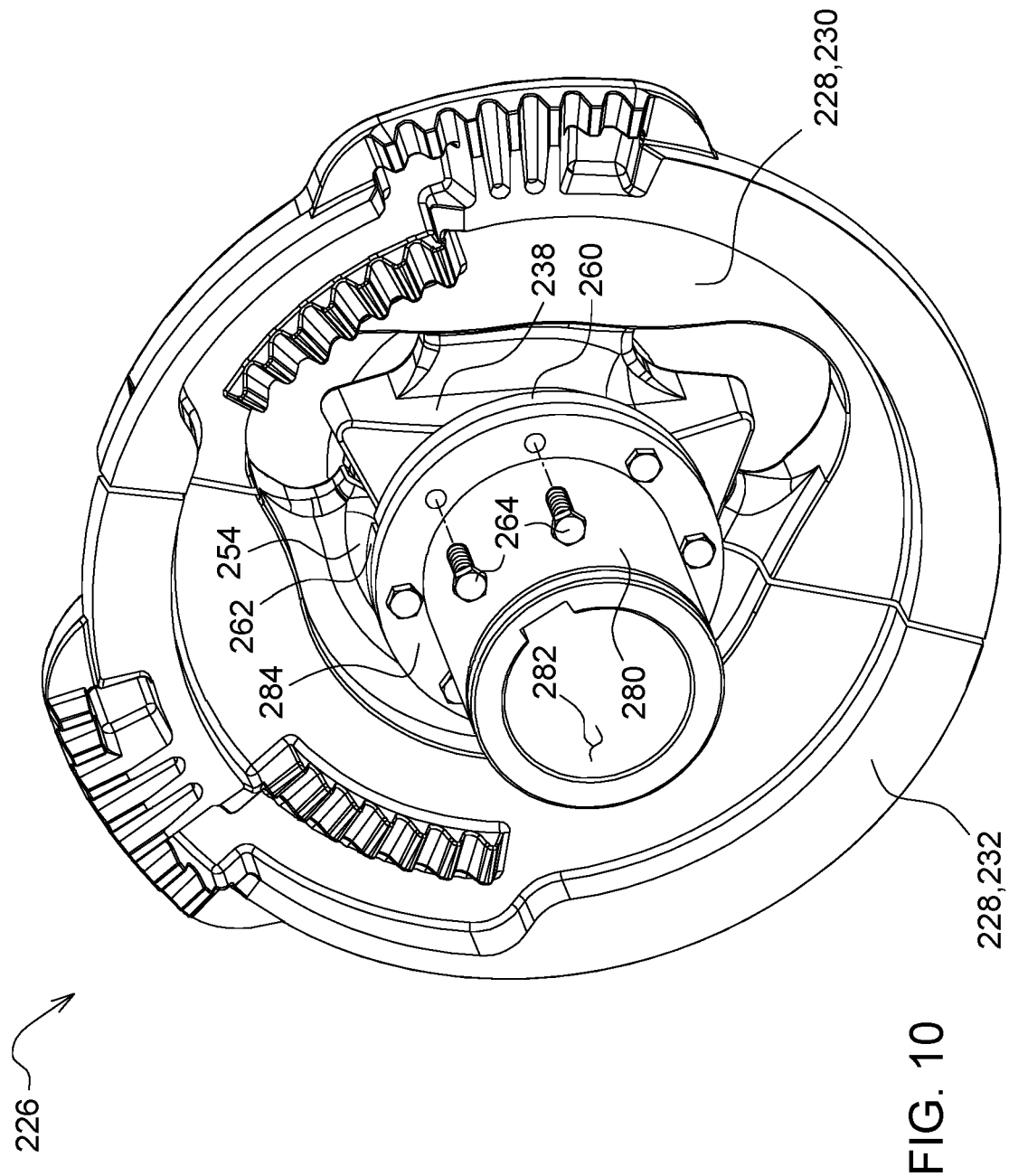
FIG. 10 is a drive side perspective view of a third embodiment of a two piece knotter gear including a separate inner hub.

Embodiment of FIG. 10

FIG. 10 shows selected portions of another knotter assembly 226 including a two-piece knotter gear 228 including first and second substantially semi-circular knotter gear sectors 230 and 232, similar in many respects to the knotter gear 28 of FIGS. 2-4. The frame assembly 72 has been deleted in FIG. 10 for ease of illustration. The difference in the knotter assembly 226 of FIG. 10 lies in the manner in which the two knotter gear sectors are held together, and in the manner in which they are mounted on the drive shaft 24.

The knotter assembly 226 of FIG. 10 further includes a circumferentially continuous inner hub 280 having an inner hub passage 282 which closely receives the knotter gear drive shaft 24 therein. The inner hub 280 is not radially removable from the knotter gear drive shaft 24. The inner hub 280 is received in the central passage of the first and second sector hub portions 238 and 254. The first and second sector hub portions 238 and 254 include radially extending sector hub flange portions 260 and 262, respectively. The inner hub includes a radially extending inner hub flange 284 which engages and is bolted to the radially extending sector hub flange portions 260 and 262 of the first and second sector hub portions 238 and 254, respectively, such that the first and second knotter gear sectors 230 and 232 are rotationally fixed relative to the inner hub 280.

In the embodiment of FIG. 10 the radially extending sector hub flange portions 260 and 262 are located on the drive side of the knotter gear 228. A plurality of fasteners 264 may attach the radially extending inner hub flange 284 to the radially extending sector hub flange portions 260 and 262.

Figure 11:
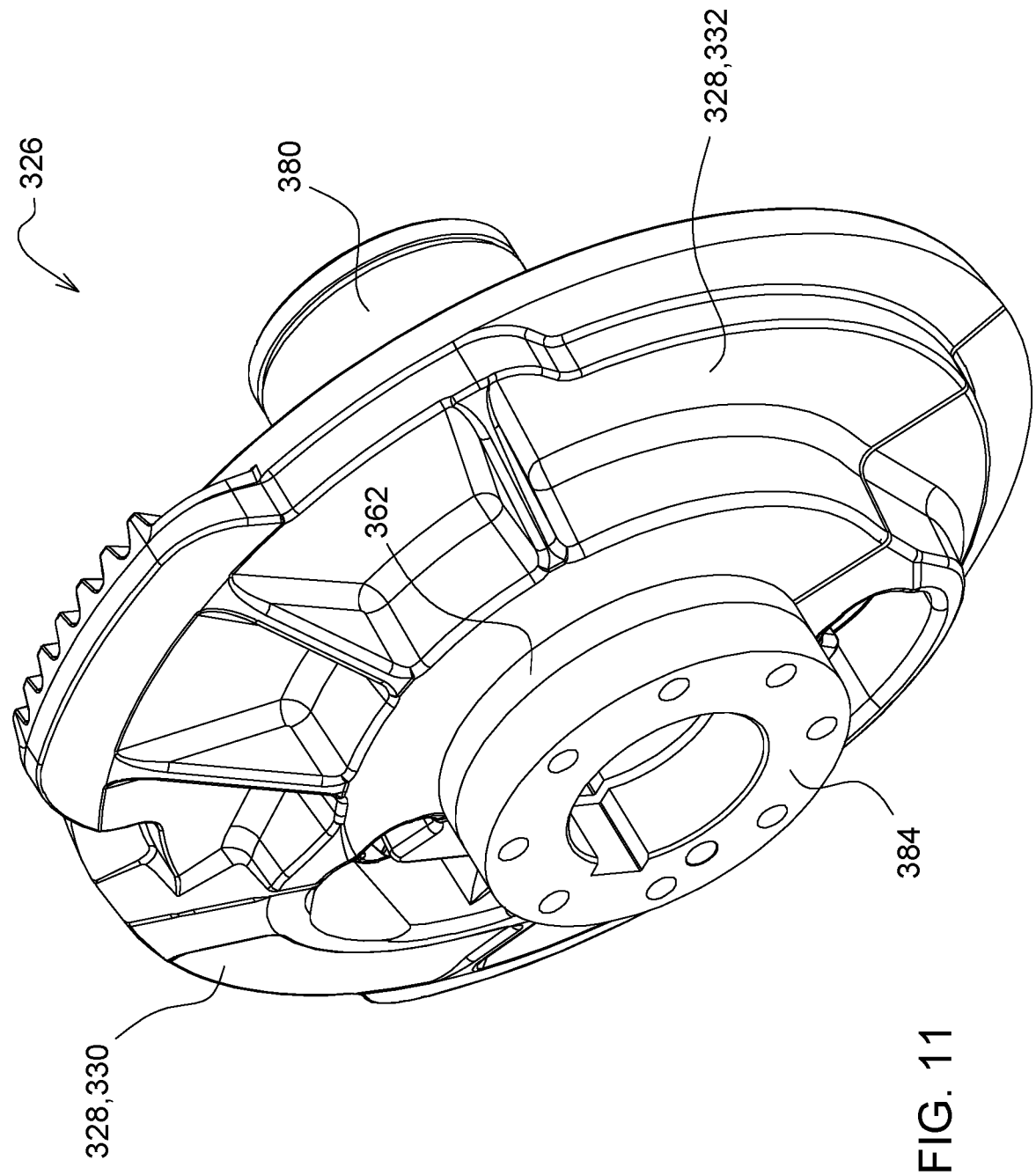
FIG. 11 is a back side perspective view of a fourth embodiment of a two piece knotter gear including a separate inner hub.
Figure 12:
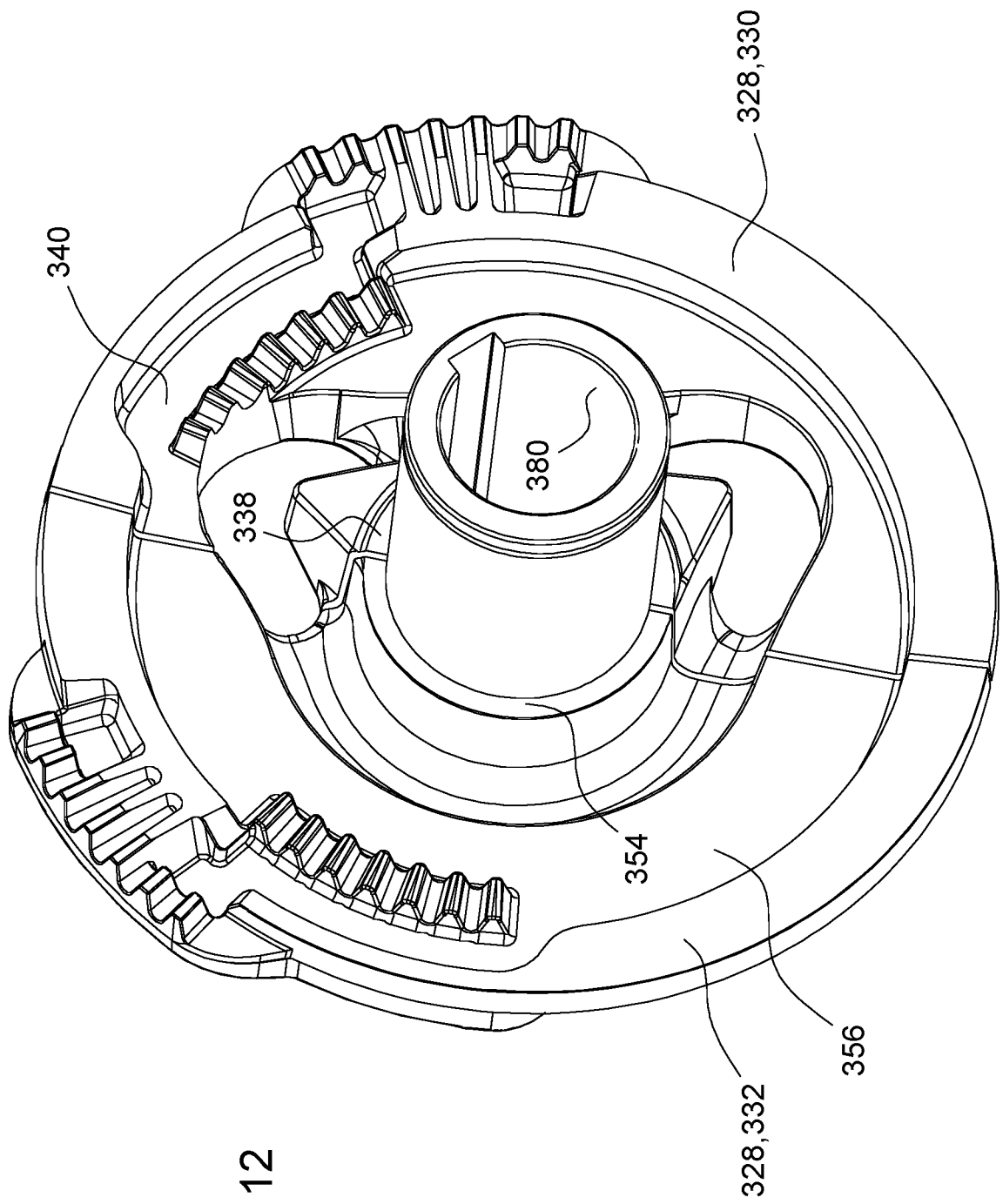
FIG. 12 is a drive side perspective view of the knotter gear of FIG. 11.

Embodiment of FIGS. 11-12

FIGS. 11 and 12 show another embodiment portions of a knotter assembly 326 similar to the knotter assembly of FIG. 10, except in this case the radial flanges connecting the continuous inner hub and the first and second gear sectors are located on the back side of the knotter gear.

In FIGS. 11 and 12 the knotter assembly 326 includes first and second gear sectors 330 and 332. First gear sector 330 includes a first sector hub portion 338 and a first sector radial portion 340. Second gear sector 332 includes a second sector hub portion 354 and a second sector radial portion 356. On the back side of the first and second sector hub portions 338 and 354 are defined radially outwardly extending hub flanges, only the second radially outward extending hub flange 362 being visible in FIG. 11.

A circumferentially continuous inner hub 380 is received through the first and second sector hub portions 338 and 354 and includes radially extending inner hub flange 384 which may be bolted to the radially outwardly extending hub flanges such as 362.

Figure 13:
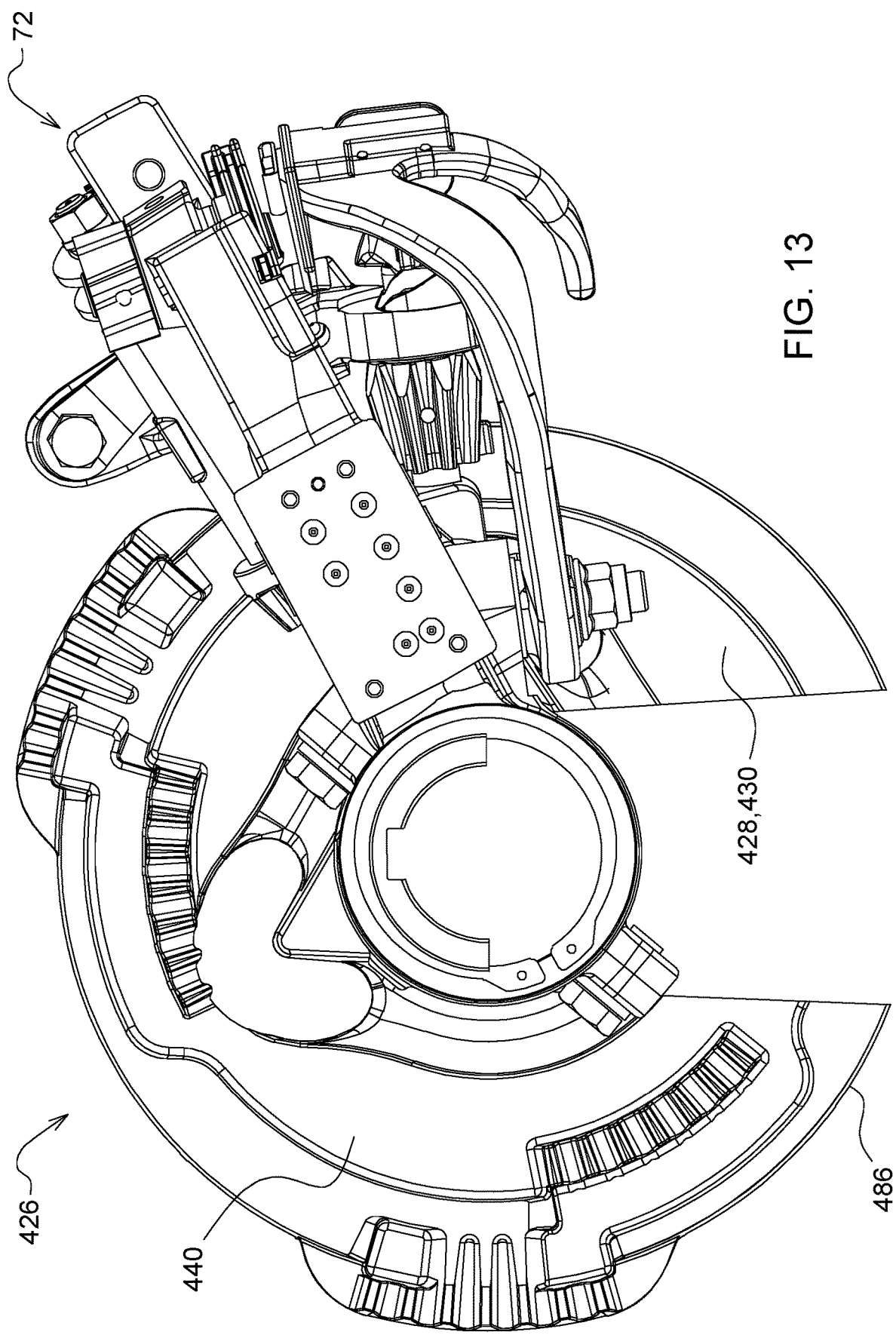
FIG. 13 is a drive side elevation view of a fifth embodiment of a radially removable knotter gear having one and only one knotter gear sector.

Embodiment of FIG. 13

FIG. 13 shows a further knotter assembly 426 which includes a one piece knotter gear 428, which may be described as including one and only one knotter gear sector 430.

The knotter gear sector 430 may be similar in construction to the first knotter gear sector 130 of the two piece knotter gear 128 of FIGS. 5-9, but in this case there is no second knotter gear sector to fill the gap in the first knotter gear sector.

The one piece knotter gear sector 430 has an outer periphery 486 of its sector radial portion 440 which preferably circumscribes greater than 270 degrees about the drive shaft axis 34.

Thus, it is seen that the apparatus and methods of the present disclosure readily achieve the ends and advantages mentioned as well as those inherent therein. While certain preferred embodiments of the disclosure have been illustrated and described for present purposes, numerous changes in the arrangement and construction of parts and steps may be made by those skilled in the art, which changes are encompassed within the scope and spirit of the present disclosure as defined by the appended claims Each disclosed feature or embodiment may be combined with any of the other disclosed features or embodiments.

What is claimed is:

1. A knotter drive apparatus, comprising:
a first knotter gear sector including a first sector hub portion and a first sector radial portion; and
a second knotter gear sector including a second sector hub portion and a second sector radial portion, the second knotter gear sector being separable from the first knotter gear sector;
wherein:
the first and second sector hub portions each are semi-cylindrical in shape such that when joined together the first and second sector hub portions define a central passage therethrough, the central passage having a central axis;
the first sector radial portion extends radially outward from the first sector hub portion relative to the central axis, and the first sector radial portion has defined thereon a plurality of intermittent gear tooth segments;
the second sector radial portion extends radially outward from the second sector hub portion relative to the central axis;
the first and second sector radial portions each circumscribe 180 degrees relative to the central axis such that the first and second knotter gear sectors are divided from each other at a diametrical divide extending diametrically relative to the central axis;

the first sector hub portion and the second sector hub portion each include hub flanges extending parallel to each other and parallel to the diametrical divide; and at least one connector connects the hub flanges.

2. The knotter drive apparatus of claim 1, wherein:

the second sector radial portion has defined thereon a second plurality of intermittent gear tooth segments;

each of the first and second sector radial portions has a drive side facing in a first axial direction and a back side facing in a second axial direction opposite the first axial direction, the respective pluralities of intermittent gear tooth segments being located on the drive sides of the respective first and second sector radial portions; and the hub flanges of the first and second sector hub portions extend from the back sides of the respective first and second sector radial portions.

3. The knotter drive apparatus of claim 1, further comprising:

a knotter gear drive shaft;

wherein the central passage is configured to closely receive the knotter gear drive shaft; and wherein at least one of the first and second sector hub portions includes an internal groove keyed to the knotter gear drive shaft such that the knotter assembly is rotationally fixed relative to the knotter gear drive shaft.

4. The knotter drive apparatus of claim 1, wherein each knotter assembly further includes:

a knotter frame including a head frame assembly connected to the first sector hub portion while permitting rotation of the first sector hub portion relative to the head frame assembly, the head frame assembly including a main head frame portion and a head frame cap configured such that when the head frame cap is bolted to the main head frame portion the head frame assembly circumscribes the knotter gear drive shaft, the head frame assembly being configured such that the head frame cap must be removed from the main head frame portion to allow the first knotter gear sector to be removed radially, relative to the drive shaft axis, from the knotter gear drive shaft.

5. A knotter drive apparatus for a baler, comprising:

a knotter gear drive shaft having a drive shaft axis and a shaft outside diameter; and a plurality of knotter assemblies mounted on the knotter gear drive shaft, each knotter assembly including a first knotter gear sector including a first sector hub portion and a first sector radial portion, and a second knotter gear sector including a second sector hub portion and a second sector radial portion, the second knotter gear sector being separable from the first knotter gear sector, each knotter assembly further including at least one connector connecting the first and second knotter gear sectors when the knotter assembly is installed on the knotter gear drive shaft;

wherein:

a central passage of each knotter assembly is at least partly defined in the first sector hub portion for receiving the knotter gear drive shaft;

the first sector radial portion extends radially outward from the first sector hub portion relative to the drive shaft axis, and has defined thereon a plurality of intermittent gear tooth segments;

the first knotter gear sector has a circumferential gap defined therein greater than the shaft outside diameter such that the first knotter gear sector is removable radially, relative to the drive shaft axis, from the knotter gear drive shaft without first sliding the first knotter gear sector axially off of the knotter gear drive shaft;

the second sector hub portion defines a further part of the central passage;

the second sector radial portion extends radially outward from the second sector hub portion relative to the drive shaft axis;

the second knotter gear sector closes the circumferential gap of the first knotter gear sector when the knotter assembly is installed on the knotter gear drive shaft;

the first sector radial portion circumscribes greater than 180 degrees relative to the drive shaft axis;

the second sector radial portion circumscribes less than 180 degrees relative to the drive shaft axis;

one of the first and second sector radial portions includes a boss having a connector passage defined therethrough transverse to the drive shaft axis;

the other of the first and second sector radial portions has a threaded connector receptacle defined therein and aligned with the connector passage; and the at least one connector extends through the connector passage into the threaded connector receptacle to connect the first and second sector radial portions.

6. The knotter drive apparatus of claim 5, wherein:

all of the intermittent gear tooth segments of the knotter assembly are located on the first sector radial portion.

* * * * *